Sept. 28, 1926.

A B. IRELAND ET AL

POWER FEED MECHANISM FOR SAWMILLS

Filed Oct. 2, 1924   2 Sheets-Sheet 1

1,601,530

INVENTOR
A. BERTSELL IRELAND &
FRANK L. IRELAND.
BY
ATTORNEY

Sept. 28, 1926.  1,601,530
A B. IRELAND ET AL
POWER FEED MECHANISM FOR SAWMILLS
Filed Oct. 2, 1924   2 Sheets-Sheet 2
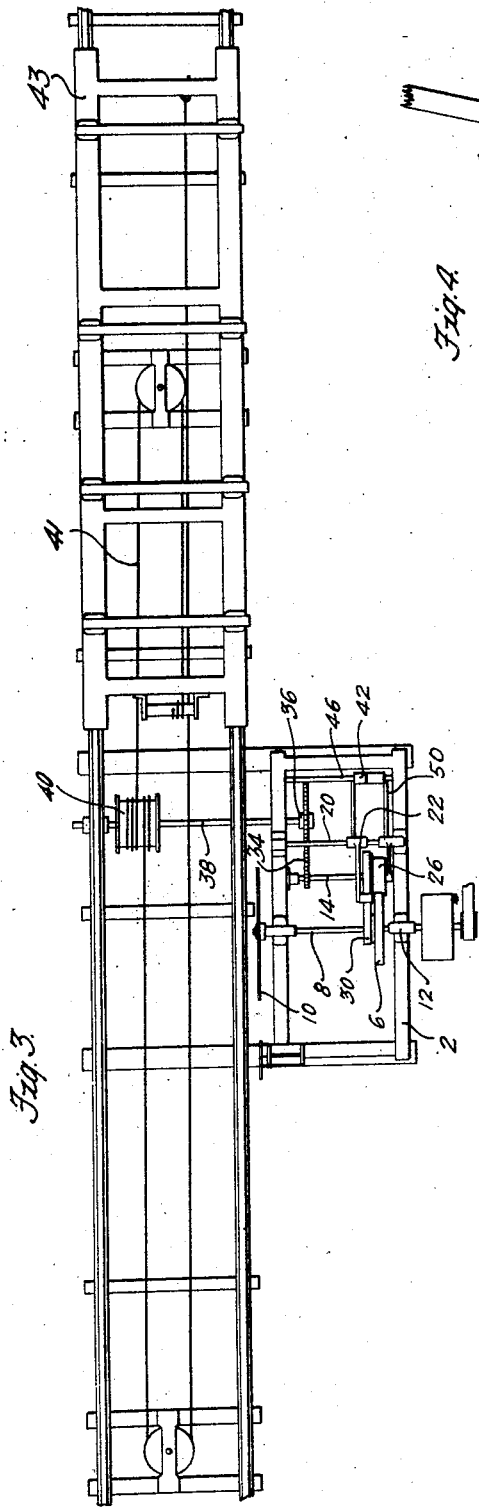
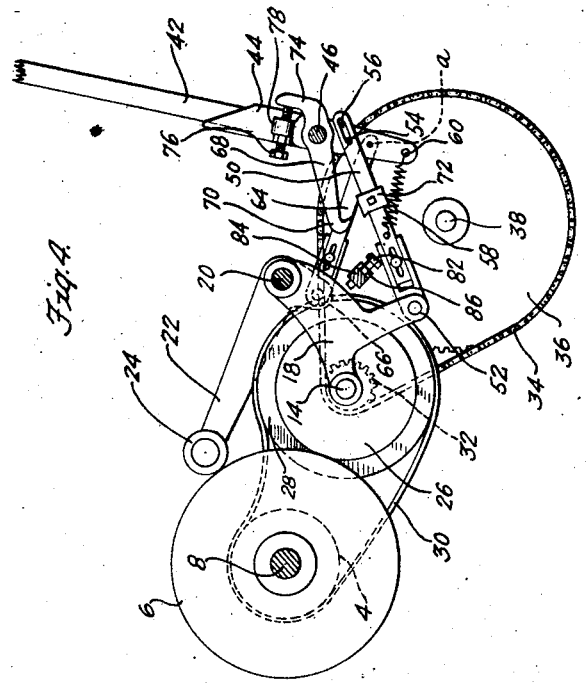
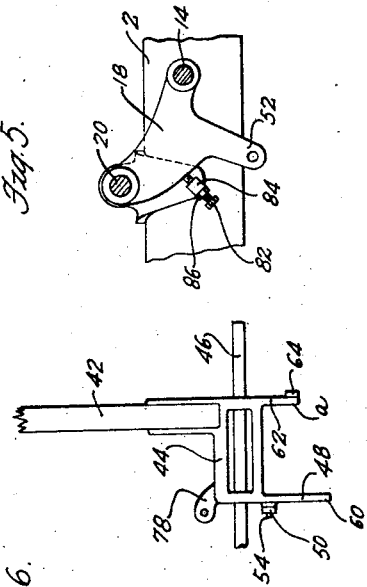
INVENTOR
A. BERTSELL IRELAND &
FRANK L. IRELAND
BY
ATTORNEY Patented Sept. 28, 1926.

1,601,530

UNITED STATES PATENT OFFICE.

A BERTSELL IRELAND AND FRANK L. IRELAND, OF NORWICH, NEW YORK.

POWER-FEED MECHANISM FOR SAWMILLS.

Application filed October 2, 1924. Serial No. 741,218.

This invention relates to power feed mechanisms and particularly to feed mechanisms such as are used with saw mills for effecting the feeding movement of the log carriage and also its return movement.

An object of the inventon is to provide feeding mechanism for the foregoing and similar purposes which, while giving the desired range of gradation of feeding speeds and the desired application of power to the feeding, will be extremely simple in construction and operation and substantially free from liability to accidental operation.

The invention further aims to provide feeding and gigging mechanism which facilitates the control of the feeding and gigging by the operator while providing such a range of control that the fullest advantage may be taken of the power provided for operating the mill. Thus, for example, when operating either upon hard logs or upon soft logs with an abundance of power, the feeding may readily be so controlled as to obtain the maximum production of well sawn lumber per unit of time. Likewise in mills operated only by light power the feeding can also be controlled to give the maximum production for the power available. The invention also aims to provide feeding and gigging mechanism which not only is simple in construction and easily operated, but which has its parts so arranged that wear of the parts is reduced to a minimum, thereby increasing the durability of the construction and avoiding the necessity of frequent adjustment or replacement of parts.

An important feature of the invention is the provision of means for preventing engagement of the parts which drive the feed shaft of the feeding mechanism in one direction when the parts which drive the feed shaft in the other direction are engaged. Another important feature of the invention is the simple connections through which a single lever is caused to effect, by its movement in one direction, the engagement of the parts to feed and, by its movement in the other direction, the engagement of the parts to gig.

Other objects and important features of the invention will appear from the following description in connection with the accompanying drawings, in which—

Figure 3 is a plan view of a saw mill embodying the present invention, this view showing also the log carriage and its track;

Figure 4 is a side elevation of the feed mechanism showing the parts in position for gigging;

Figure 5 is a detail elevation of the swinging support for one end of the feed shaft, and Figure 6 is a detail view of the operating lever.

Figure 1:
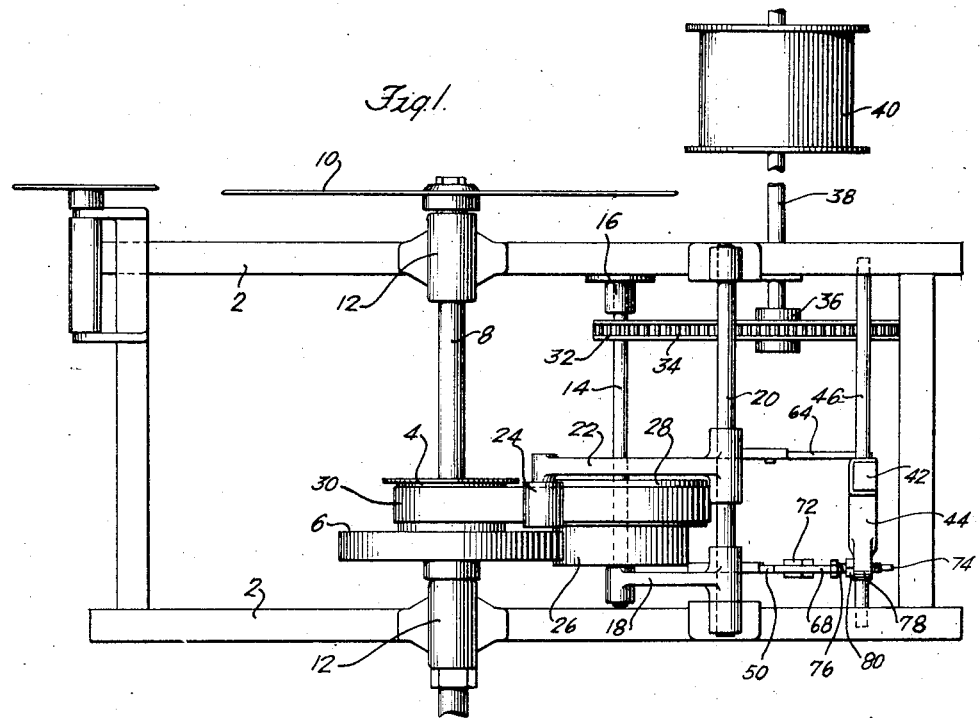
Figure 1 is a plan view of a saw mill having the feed mechanism of the present invention incorporated therein.

In the illustrated embodiment of the invention, which is a feed mechanism particularly adapted for effecting the feed and return movements of the log carriage of a saw mill, the feed mechanism is shown as mounted upon the saw mill frame 2, and comprises a flanged belt pulley 4 and a friction wheel 6 on the mandrel 8 of the saw 10, the mandrel 8 being mounted in suitable bearings 12 upon the frame 2. The normally stationary shaft 14, herein called the feed shaft, is carried in a stationary bearing 16 at one end and in a swinging bearing, formed in a bellcrank 18, at its other end, the bellcrank 18 being fulcrumed upon a cross shaft 20 extending across the frame of the sawmill, upon which shaft is also fulcrumed a bellcrank lever 22 carrying at one end a belt-engaging pulley 24 constituting a part of the belt-tightening mechanism hereinafter to be described.

The feed shaft 14 has fixed thereon a friction wheel 26 and a belt pulley 28, the friction wheel 26 standing normally slightly out of engagement with the friction wheel 6 and the belt pulley 28 being normally loosely connected to the belt pulley 4 by a belt 30 upon which the pulley 24 of the belt-tightening mechanism, hereinafter to be described, rests, but not with sufficient pressure to cause the belt pulley 4 to drive the belt pulley 28 and the associated mechanism.

Also fixed upon the feed shaft 14 is a sprocket wheel 32 over which passes a sprocket chain 34 effecting a driving connection between said sprocket wheel 32 and a larger sprocket wheel 36 on the drum shaft 38 which carries the cable drum 40 having thereon the cable 41 connected to the log carriage 43 of the mill. This cable, in a well-known manner, operates when the drum is rotated in one direction to move the carriage in one direction along its track, and when the drum is rotated in the other direction to move the carriage in the opposite direction on its track, one part of the cable winding upon the drum as another part is being unwound therefrom.

A very slight movement of the bellcrank 18 which carries the movable bearing of the shaft 14 will effect the movement of the friction wheel 26 into frictional engagement with the sprocket wheel 36, the force of this engagement being varied to suit the operator and to vary the speed of the gigging or return movement of the carriage. Such movement of the bellcrank 18 is effected by connections to an operating lever now to be described.

The operating lever, which may comprise a suitable handle 42 of wood or other material and a two-armed casting 44 is mounted upon a cross shaft 46, extending across the sawmill frame, to swing about the axis of said shaft. The arm 48 of the lever is connected by a link 50 to an arm 52 on the bellcrank lever 18, the connection between the arm 48 and the link 50 comprising a bolt or screw 54 threaded into an opening tapped in the arm 48 and extending through a slot 56 in the link 50, whereby lost motion is provided in the connection between the bellcrank 18 and the lever arm 48 for the purposes hereinafter set forth. A spring 58 connected at one end to a pin on the link 50 and at its other end through the hole 60 in the lower end of the arm 48, tends to hold the lever in neutral position when the operator is not operating it.

The other arm 62 of the lever casting 44 is connected by a link 64 to the arm 66 of the bell crank 22.

Figure 2:
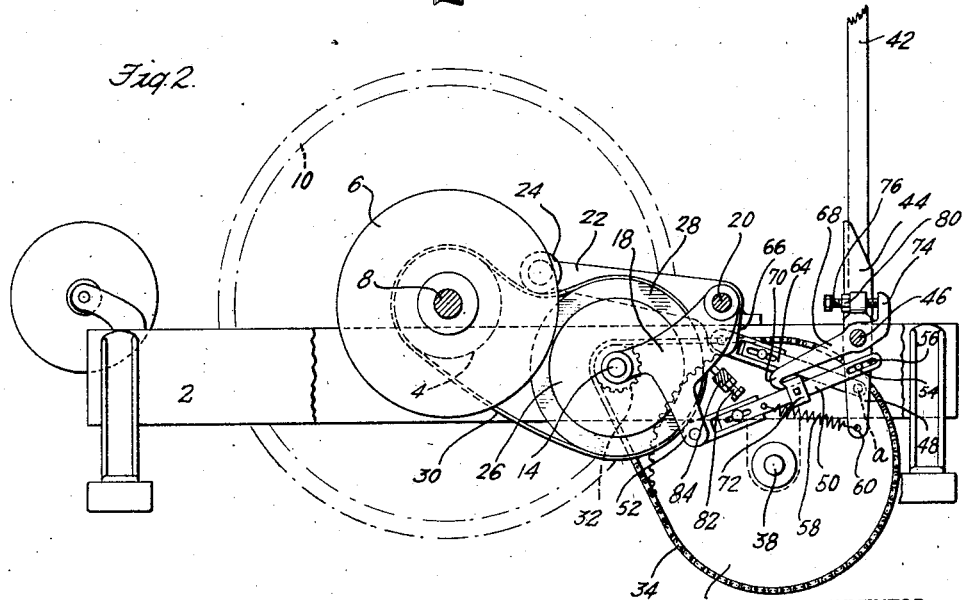
Figure 2 is a side elevation of the mill shown in Figure 1.

From the foregoing description it will be seen that when the lever is rocked in one direction about the axis of the shaft 46, for example, in a counter-clockwise direction in Fig. 2, it will rock the bellcrank 22 in the direction to cause the pulley 24 to tighten the belt 30 and thus cause the belt pulley 4 to drive the belt pulley 28, thereby driving the feed shaft 14 in the direction to feed the carriage toward the saw. When the lever is rocked in the other direction, that is clockwise in Fig. 2, the bolt or screw 54 will engage the inner end of the slot 56 in the link 50 and thus swing the bell crank 18 in the direction to cause the friction wheel 26 to engage the friction wheel 6, thereby causing the shaft 14 to be driven in the direction to move the carriage away from the saw or return it to its starting position.

It will be seen that when the lever is moving in the clockwise direction in Fig. 2, the screw or bolt 54 will move along the slot 56 without moving the link 50 to rock the lever 18 while the link 64 is rocking the bellcrank 22 to tighten the belt 30. To prevent the possibility of movement of the link 50 to rock the lever 18 and cause the engagement of the friction wheels 6 and 26, a lock is provided which automatically locks the link 50 against movement in the direction that would cause the engagement of the friction wheels, the illustrated lock comprising a pawl or dog 68 fulcrumed upon the shaft 46 and having a hooked end 70 adapted to hook over an adjustable block or stop 72 on the link 50, the pawl or dog 68 being provided at its other end with a tail 74 adapted to be engaged by set screw 76 adjustable through an ear 78 upon the casting 44 and held in its adjusted position by a lock nut 80. As shown in Fig. 2 of the drawings, the set screw 76 is so adjusted that it permits the hook 70 to hook over the block 72 when the lever is in neutral position, and that when it is rocked in a clockwise direction to effect the engagement of the friction wheels 6 and 26, the engagement of the set screw 76 with the tail 74 will immediately rock the hook 70 out of engagement with the block 72, thereby permitting the movement of the link 50 as soon as the screw or bolt 54 has reached the inner end of the slot 56.

When the lever is moved in a counter-clockwise direction to cause the bellcrank 22 to tighten the belt 30, set screw 76 moves away from the tail 74 of the dog 68, thus leaving the hook 70 in engagement with the block 72 and preventing accidental movement of the link 50 in the direction to engage the friction wheels 6 and 26. It will thus be seen that the dog 68 not only prevents accidental engagement of the friction wheels 6 and 26 when the feed mechanism is being operated to feed the carriage, but it also prevents accidental engagement of the friction wheels when the lever is in neutral position and the feeding mechanism is at rest. It will also be seen that the spring 58 tends to hold the operating lever away from the position in which it effects the rocking of the bellcrank 22 into belt-tightening position, thereby preventing accidental starting of the feed mechanism to feed the carriage toward the saw.

The bellcrank 18 is limited in its movement to carry the friction wheel 26 away from the friction wheel 6 by a stop comprising a set screw 82 in a stud 84 on the bearing bracket for the shaft 20, this set screw being adapted to permit adjustment of the distance apart of the friction wheels 6 and 26. A lock nut 86 is provided to secure the set screw 82 in its adjusted position.

From the foregoing description it will be seen that the feed mechanism is very simple both in its construction and in its operation; that it is not liable to accidental connection, and that there is a minimum amount of wear of the parts owing to the fact that the elements of the feed mechanism proper are not moving except when the mechanism is either feeding or gigging the carriage. Moreover, when feeding the carriage a slight variation in pressure on the handle 42 of the lever will give any desired degree of speed or power of feed to the carriage, which is particularly useful in sawing hard wood logs, and likewise the return movement or gigging of the carriage may be controlled with equal facility.

What is claimed as new is:

1. Feed mechanism of the class described comprising, in combination, a power driven shaft and a feed shaft, a belt pulley and a friction wheel on said power driven shaft, a cooperating belt pulley and friction wheel on said feed shaft, a belt connecting said belt pulleys and a belt tightener engaging said belt, an operating lever and connections between said operating lever and said tightener and between said lever and said last mentioned friction pulley, whereby movement of said lever in one direction tightens said belt to drive the feed shaft in one direction and whereby movement of the lever in the opposite direction engages said friction pulleys to drive said feed shaft in the reverse direction.

2. In feed mechanism of the class described, the combination with a power driven shaft having thereon a belt pulley and a friction wheel, a feed shaft having thereon a cooperating belt pulley and a cooperating friction wheel, a belt connecting said belt pulleys and a belt tightener engaging said belt, said belt being normally in slack condition and said friction wheels being normally out of engagement, an operating lever, connections between said operating lever and said belt tightener comprising a link and a bellcrank whereby movement of said lever in one direction tightens said belt to cause the power driven pulley to drive the feed shaft pulley, and connections between said lever and the feed shaft, including a link and a swinging bearing for one end of the feed shaft whereby movement of said operating lever in the reverse direction effects the movement of the feed shaft friction pulley into engagement with the power driven pulley.

3. Feed mechanism of the class described comprising, in combination, a power driven shaft and a feed shaft, a belt pulley and a friction wheel on said power driven shaft, a cooperating belt pulley and a cooperating friction wheel on said feed shaft, a belt connecting said belt pulleys and a belt tightener engaging said belt, an operating lever and connections between said operating lever and said belt tightener and between said lever and said last-mentioned friction wheel, whereby movement of said lever in one direction tightens said belt to drive the feed shaft in one direction and whereby movement of the lever in the reverse direction engages said friction wheels to drive said feed shaft in the reverse direction, and means for automatically locking the drive in one direction out of operative condition when the drive in the other direction is rendered operative.

4. Feed mechanism of the class described comprising, in combination, parallel shafts one of which is power driven, a belt pulley and a friction wheel on each shaft arranged to cooperate with the belt pulley and friction wheel of the other shaft, a belt connecting said belt pulleys but normally in non-driving condition, a single operating lever normally in neutral position, means whereby said lever tightens said belt into driving condition upon movement in one direction from its neutral position and separate means whereby it engages said friction wheels upon movement in the opposite direction from said neutral position.

5. Feed mechanism of the class described comprising, in combination, parallel shafts one of which is power driven, a belt pulley and a friction wheel on each shaft arranged to cooperate with the corresponding pulley and wheel of the other shaft, a belt connecting said belt pulleys but normally in non-driving condition, means for tightening said belt to transmit power from said power driven shaft to the other shaft, means for bringing said friction pulleys into driving engagement, a single operating lever for said last mentioned two means, and connections whereby one of said means is locked out of operative condition while the other is operating.

6. Feed mechanism of the class described comprising, in combination, a plurality of shafts one of which is power driven, a belt pulley and a friction wheel on each shaft arranged to cooperate with the belt pulley and friction wheel of the other shaft, a belt connecting said belt pulleys but normally in non-driving condition, a single operating lever normally in neutral position, means whereby said lever tightens said belt into driving condition upon movement in one direction from its neutral position and means whereby it engages said friction wheels upon movement in the opposite direction from said neutral position, and means for retaining the friction wheel moving means against movement during the operation of tightening the belt driving means.

Signed at Norwich, N. Y., this 27th day of September, 1924.

A BERTSELL IRELAND.
FRANK L. IRELAND.